United States Patent
Unno et al.

(10) Patent No.: US 7,183,748 B1
(45) Date of Patent: Feb. 27, 2007

(54) ELECTRIC CHARGER AND POWER SUPPLY DEVICE FOR PORTABLE TERMINAL

(75) Inventors: Hirokazu Unno, Inagi (JP); Hisashi Hayasaka, Inagi (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/181,451

(22) PCT Filed: Feb. 7, 2000

(86) PCT No.: PCT/JP00/00652

§ 371 (c)(1),
(2), (4) Date: Nov. 12, 2002

(87) PCT Pub. No.: WO01/59905

PCT Pub. Date: Aug. 16, 2001

(51) Int. Cl.
*H02J 7/00* (2006.01)

(52) U.S. Cl. .................................. 320/136; 320/134

(58) Field of Classification Search .............. 320/107, 320/112, 134, 141, 149, 136, 113, 115, 127, 320/128, 137, 2, 5, 6, 10, 13, 14, 17, 21, 320/22; 307/66
See application file for complete search history.

(56) References Cited

U.S. PATENT DOCUMENTS

| | | | |
|---|---|---|---|
| 5,581,170 A * | 12/1996 | Mammano et al. ......... 320/116 |
| 5,945,811 A * | 8/1999 | Hasegawa et al. .......... 320/141 |
| 5,959,436 A * | 9/1999 | Takashina et al. .......... 320/134 |
| 5,982,151 A * | 11/1999 | Nagai et al. ................ 320/141 |
| 6,057,609 A * | 5/2000 | Nagai et al. .................. 307/66 |
| 6,297,619 B1 * | 10/2001 | Terada ........................ 320/134 |
| 6,795,322 B2 * | 9/2004 | Aihara et al. ................ 363/37 |

FOREIGN PATENT DOCUMENTS

| JP | 6-78467 | | 3/1994 |
|---|---|---|---|
| JP | 06197468 A | * | 7/1994 |
| JP | 9-65576 | | 3/1997 |
| JP | 9-130983 | | 5/1997 |

* cited by examiner

*Primary Examiner*—Karl Easthom
*Assistant Examiner*—Aaron Piggush
(74) *Attorney, Agent, or Firm*—Arent Fox PLLC

(57) ABSTRACT

A charging control unit decides the number of battery cells on the basis of an output voltage of a battery pack, and an output voltage of a charging circuit is determined in accordance with the decided number of battery cells. Even though supply of an external power supply is detected, when a battery connection is not detected, the power supply circuit of the charging control unit is set in a stop state. In addition, when disconnection of the battery is detected, a canceling voltage for canceling a cutoff state caused by overdischarging of the battery is output. In a power supply device for a portable terminal, a capacitor electrically charged by an output voltage of main DC/DC converter is connected as an auxiliary power supply of a backup DC/DC converter to make exchange of the auxiliary battery unnecessary.

3 Claims, 12 Drawing Sheets

FIG. 8

| BATTERY CONNECTION DETECTION SIGNAL E2 | EXTERNAL POWER SUPPLY DETECTION SIGNAL E7 | INTERNAL POWER SUPPLY CONTROL SIGNAL E8 |
|---|---|---|
| L | L | L |
| L | H | L |
| H | L | L |
| H | H | H | ns
ELECTRIC CHARGER AND POWER SUPPLY DEVICE FOR PORTABLE TERMINAL

TECHNICAL FIELD

The present invention relates to an electric charger for charging a battery used in a portable terminal and a power supply device for a portable terminal, and more particularly, to an electric charger for appropriately charging a lithium ion battery and a power supply device for a portable terminal for appropriately performing exchange of batteries.

BACKGROUND ART

In recent years, elements decrease in size, the degrees of integration of LSIs increases, and the performances of CPUs are improved. Therefore, a portable telephone, personal computer communication, the internet, communication equipment are enriched, so that portable terminals such as notebook computer, handy terminals, and mobile computers increase in trade. Such a portable terminal is driven by a battery and is frequently operated on the assumption that batteries are exchanged. For this reason, a spare battery must be electrically charged by an electric charger. As batteries for portable terminals, in recent years, lithium ion batteries are rapidly diffused. The lithium ion battery has an energy density per weight which is about three times that of a nickel-cadmium or nickel metal hydride battery and an energy density per volume which is twice that of a nickel-cadmium or nickel metal hydride battery. The nickel ion battery is a compact and light-weight battery having a large capacity, and is used in various portable devices. The lithium ion battery uses a battery cell which generates 3.6 V as a base unit. Battery cells the number of which is dependent on a power supply voltage required by the portable terminal are stored in a cylindrical or square package. For example, a two-cell battery generates 7.2 V, and a three-cell battery generates 10.8 V.

However, the numbers of battery cells used in lithium ion batteries used portable terminals of different types are different from each other. It is actual that electric chargers dedicated to the respective terminals are used. The number of electric chargers increases as the number of portable terminals increases, and it is disadvantageously cumbersome that the electric chargers are selectively used. When an AC adapter is connected to a conventional electric charger, the internal circuit of the electric charger operates without inserting a battery into the electric charger to consume wasteful power. Furthermore, a protection circuit for cutting off the battery output in an overdischarging state is built in the lithium ion battery. In this cutoff state, a battery abnormal signal (battery alarm signal) is output from a dedicated terminal to the outside of the battery. The cutoff state of the lithium ion battery can be canceled by applying an external battery. However, even though the lithium ion battery in the cutoff state is connected to the electric charger, the cutoff state cannot be canceled. This is because a battery voltage cannot be obtained by the cutoff operation, or the battery abnormal signal is in the same signal state as a battery disconnection state when viewed from the electric charger. For this reason, even though the lithium ion battery in the cutoff state is connected to the electric charger, battery disconnection is detected, and a charging voltage is not supplied. For this reason, the cutoff state cannot be canceled. Therefore, in a conventional art, a voltage is supplied such that a battery connection is detected by a microswitch, or periodical voltage application must be performed, so that the circuit configuration of the electric charger is disadvantageously complicated. In addition, in a portable terminal using a lithium ion battery, the battery is exchanged in a suspend state. However, since the suspend state of the device is held while the battery is removed from the device, an auxiliary battery such as a disposable lithium battery is arranged in the device. For this reason, the auxiliary battery must be also exchanged periodically or in shortage of battery capacity. However, since the auxiliary battery is occasionally exchanged, a new battery is not prepared, or the batteries are cumbersomely exchanged because of inexperience. Furthermore, the auxiliary battery must be stored to have a structure in which the battery can be exchanged. Accordingly, the device structure is complicated, and the device cannot be easily reduced in size and weight as a portable terminal.

DISCLOSURE OF INVENTION

According to the present invention, there is provided an electric charger for a lithium ion battery which can electrically charge batteries having different numbers of cells, prevents wasteful power consumption in an out-of-use state, and can cancel a battery cutoff operation with a simple circuit.

According to the present invention, there is provided a power supply device for a portable terminal which does not use an auxiliary battery required in exchange of batteries.

The electric charger according to the present invention includes: a charging circuit for outputting a charging voltage depending on the number of battery cells built in a battery in a supply state of an external power supply; and a charging control unit for turning on a switch unit arranged on a connection path extending from the charging circuit to the battery when connection of the battery is detected, and is characterized in that, in the charging control unit, a cell decision unit for deciding the number of battery cells on the basis of an output voltage of the battery detected in non-charging state in which the switch unit is turned off and a voltage determination unit for determining an output voltage of the charging circuit in accordance with the number of battery cells decided by the cell decision unit are arranged. In this case, the charging circuit uses a DC/DC converter which can change an output voltage by a signal from the voltage determination unit. The battery is a lithium ion battery. In this manner, since the number of cells is determined on the basis of the voltage of a connected battery to determine a charging voltage before charging is started, even batteries having different numbers of battery cells can be electrically charged by using the same charger. Therefore, the types of necessary chargers can be reduced in number even though portable terminals using batteries decrease in number.

Another electric charger according to the present invention includes: a charging circuit for outputting a charging voltage depending on the number of battery cells built in a battery in a supply state of an external power supply; a charging control unit for turning on a switch unit arranged on a connection path extending from the charging circuit to the battery when connection of the battery is detected; and an internal power supply circuit for applying a predetermined power supply voltage to the charging control unit in the supply state of the external power supply to operate the charging control unit, and is characterized in that an external power supply detection circuit for detecting a supply of the external power supply, a battery connection detection circuit for detecting a connection of the battery, and a power supply control circuit for operating the power supply circuit to supply a power to the charging control unit when the supply of both the external power supply and the battery connection are detected from detection signals from the external power supply detection circuit and the battery connection detection circuit and for setting the power supply circuit in a stop state to stop the power supply to the charging control circuit when only at least one of the supply of the external power supply and the connection of the battery are arranged. The power supply control circuit is an AND circuit for outputting a logical AND of detection signals of the external power supply detection circuit and the battery connection detection circuit. In this manner, in the electric charger according to the present invention, when the battery is not connected in the supply state of the external power supply set by connecting an AC adapter, the internal power supply circuit of the charging control unit is set in a stop state to prevent wasteful power from being consumed in a standby state.

Still another electric charger according to the present invention includes: a charging circuit for outputting a charging voltage depending on the number of battery cells built in a battery in a supply state of an external power supply; and a charging control unit for turning on a switch unit arranged on a connection path extending from the charging circuit to the battery when connection of the battery is detected, and is characterized in that a cutoff canceling circuit for outputting a canceling voltage for canceling a cutoff state set by overcharging of the battery when disconnection of the battery is detected is arranged. This cutoff canceling circuit includes a first FET switch having a source connected to the output of the charging circuit, a second FET switch which has a source connected to the drain of the first FET switch and a drain connected to the battery and which is ON/OFF-controlled by the charging control unit, and a switch control circuit for turning on the first FET switch in a disconnection state of the battery to supply a charging voltage for canceling the cutoff state to the battery through a parasitic diode of the second FET switch in an OFF state. This switch control circuit is an OR circuit to which a battery abnormal signal (battery alarm signal) output from the battery and a switch-on signal output from the charging control unit in the detection of the battery connection are input. For this reason, a charging voltage is applied to a battery connection terminal of the electric charger according to the present invention through a path which always passes through the parasitic diode of the FET switch. When a battery set in a cutoff state by the operation of the protection circuit due to overcharging is connected to the electric charger, a voltage is applied to the battery to cancel the cutoff state. Therefore, the cutoff state can be canceled by a simple circuit.

A power supply device for a portable terminal according to the present invention includes: a first DC/DC converter which receives a power supply from a chargeable battery to supply a stable power supply to a main circuit unit of the device; and a second DC/DC converter which receives a power supply from an auxiliary power supply and operates when the battery is removed to supply a power to the main circuit unit to back up the main circuit unit, and is characterized in that, as the auxiliary power supply, a capacitor electrically charged by an output voltage of the first DC/DC converter is connected. As the capacitor connected as the auxiliary power supply, an electric double layer capacitor is used. Since the capacitor electrically charged by the power supply on the main side is connected in place of the auxiliary battery, the auxiliary battery need not be exchanged. As a result, a portable terminal decreases in size and weight. The electric double layer capacitor is compact but has a large capacity in a farad order, and can assure a backup time which is sufficient as a backup time of the auxiliary power supply.

BRIEF DESCRIPTION OF DRAWINGS

FIG. 8 is a table for explaining input/output characteristics of an AND circuit in FIG. 7;

BEST MODE FOR CARRYING OUT THE INVENTION

Figure 1:
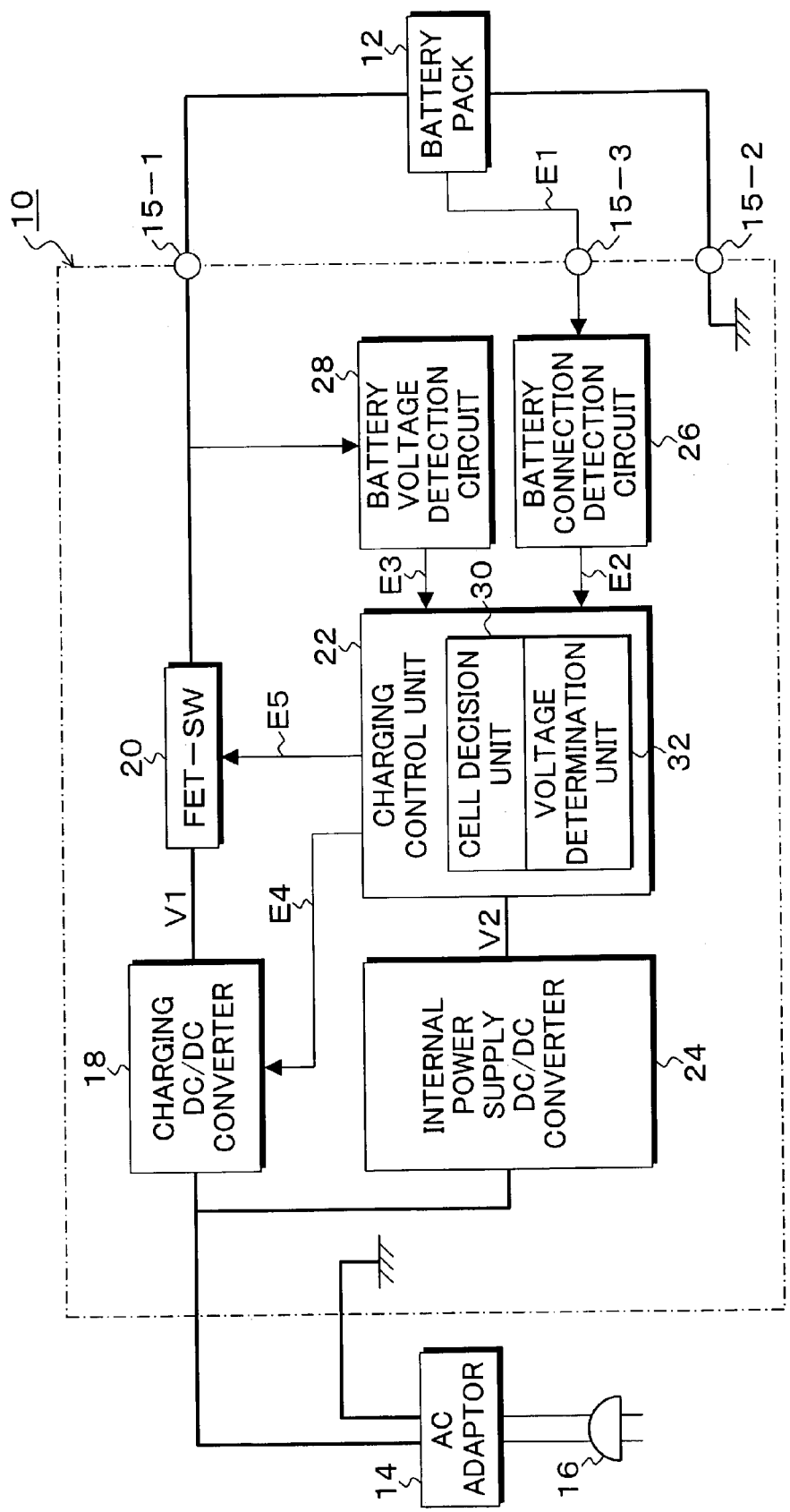
FIG. 1 is a circuit block diagram of the first embodiment of the present invention.

FIG. 1 is a circuit block diagram of the first embodiment of an electric charger according to the present invention. An electric charger 10 according to the present invention is used such that a plug 16 of an AC adapter 14 is connected to an outlet of an AC power supply. A battery pack 12 to be electrically charged is connected to the electric charger 10 through terminals 15-1, 15-2, and 15-3. As the battery pack 12, a lithium ion battery is used and has, e.g., a cylindrical package structure in which a plurality of lithium ion battery cells are built. The plurality of lithium ion battery cells stored in the battery pack 12 generate a battery voltage of 3.6 V each. As the battery pack 12 which can be electrically charged by the electric charger 10 according to the present invention, a battery pack 12 in which two or three lithium ion battery cells are stored is used as a targeted. The battery pack 12 in which two cells are stored has a normal battery voltage of 7.2 V, and the battery pack 12 in which three cells are stored as a normal battery voltage of 10.8 V. The terminal 15-1 of the electric charger 10 is a positive terminal, the terminal 15-2 is a negative terminal, and the terminal 15-3 is an input terminal of a battery abnormal signal (battery alarm signal) E1 output from the battery pack 12. The battery abnormal signal E1 is output when overcharging or overdischarging is detected by a protection circuit built in the battery pack 12. More specifically, when the battery pack 12 normally generates a battery voltage, the battery abnormal signal is at an H level. When abnormality such as overdischarging or overcharging is detected, the battery abnormal signal is set at an L level which represents an abnormal output state. In addition, when abnormality such as overdischarging or overcharging is detected by the battery pack 12, a battery output is set in a cutoff state by the operation of a built-in switch element.

In the electric charger 10, a charging DC/DC converter 18, an FET switch 20, a charging control unit 22, an internal power supply DC/DC converter 24, a battery connection detection circuit 26, and a battery voltage detection circuit 28 are arranged. The charging DC/DC converter 18 converts a DC input voltage from the AC adapter 14 into a charging voltage V1 required for charging the battery pack 12 to output the charging voltage V1. In this case, the charging voltage V1 of the charging DC/DC converter 18 is switched to a charging voltage corresponding to the two cells or the three cells of the battery pack 12 by a charging voltage control signal E4 from the charging control unit 22. When the battery pack 12 outputs a voltage of 10.8 V which is the normal battery voltage of the three cells, the charging DC/DC converter 18 outputs, e.g., V1=12.3 V as the charging voltage V1. When the battery pack 12 outputs a voltage of 7.2 V which is the normal battery voltage of the two cells, the charging DC/DC converter 18 outputs, e.g., V1=8.2 V as the charging voltage V1. As a matter of course, the charging voltage V1 corresponding to the two cells or the three cells may be a voltage which is higher than the normal battery voltage by a predetermined ratio, and an appropriate charging voltage is determined as needed. The charging control unit 22 operates by receiving a power supply voltage V2 from the internal power supply DC/DC converter 24 in an external power supply state obtained by the AC adapter 14. In this operation state, when connection of the battery pack 12 to the electric charger 10 is detected, the number of cells is decided on the basis of the battery voltage obtained at this time. A charging voltage corresponding to the number of cells is determined, and the charging voltage V1 of the charging DC/DC converter 18 is controlled by the charging voltage control signal E4. Subsequently, the FET switch 20 is turned on by a control signal E5 to start charging of the battery pack 12. For this reason, in the charging control unit 22, the functions of a cell decision unit 30 and a voltage determination unit 32 are set. The cell decision unit 30 decides on the basis of the battery voltage of the battery pack 12 detected by the battery voltage detection circuit 28 whether the number of cells is two or three. On the basis of the decision result of the number of cells of the battery pack 12 obtained by the cell decision unit 30, the voltage determination unit 32 controls the charging DC/DC converter 18 by the charging voltage control signal E4 such that the charging voltage V1=8.2 V is obtained when the number of cells is two and the charging voltage of 12.3 V is obtained when the number of cells is three.

The battery connection detection circuit 26 detects the presence/absence of battery connection on the basis of the state of the battery abnormal signal E1 when the battery pack 12 is connected to the electric charger 10. More specifically, in the battery pack 12 connected to the electric charger 10, in a normal state, the battery abnormal signal E1 is set in an H-level state representing normal when the internal protection circuit does not operate. The battery connection detection circuit 26 detects the H-level state of the abnormality detection signal E1 from the battery pack 12 to recognize battery connection and outputs a battery connection detection signal E2 to the charging control unit 22. When the charging control unit 22 receives the battery connection detection signal E2 from the battery connection detection circuit 26, the charging control unit 22 recognizes connection of the electric charger 10 of the battery pack 12. Decision of the number of cells based on the battery voltage is performed by the cell decision unit 30, and determination of a charging voltage based on the decided number of cells is performed by the voltage determination unit 32, so that charging control is started. In this case, the charging control unit 22, the battery voltage detection circuit 28, and the battery connection detection circuit 26 are realized by dedicated microprocessors.

Figure 2:
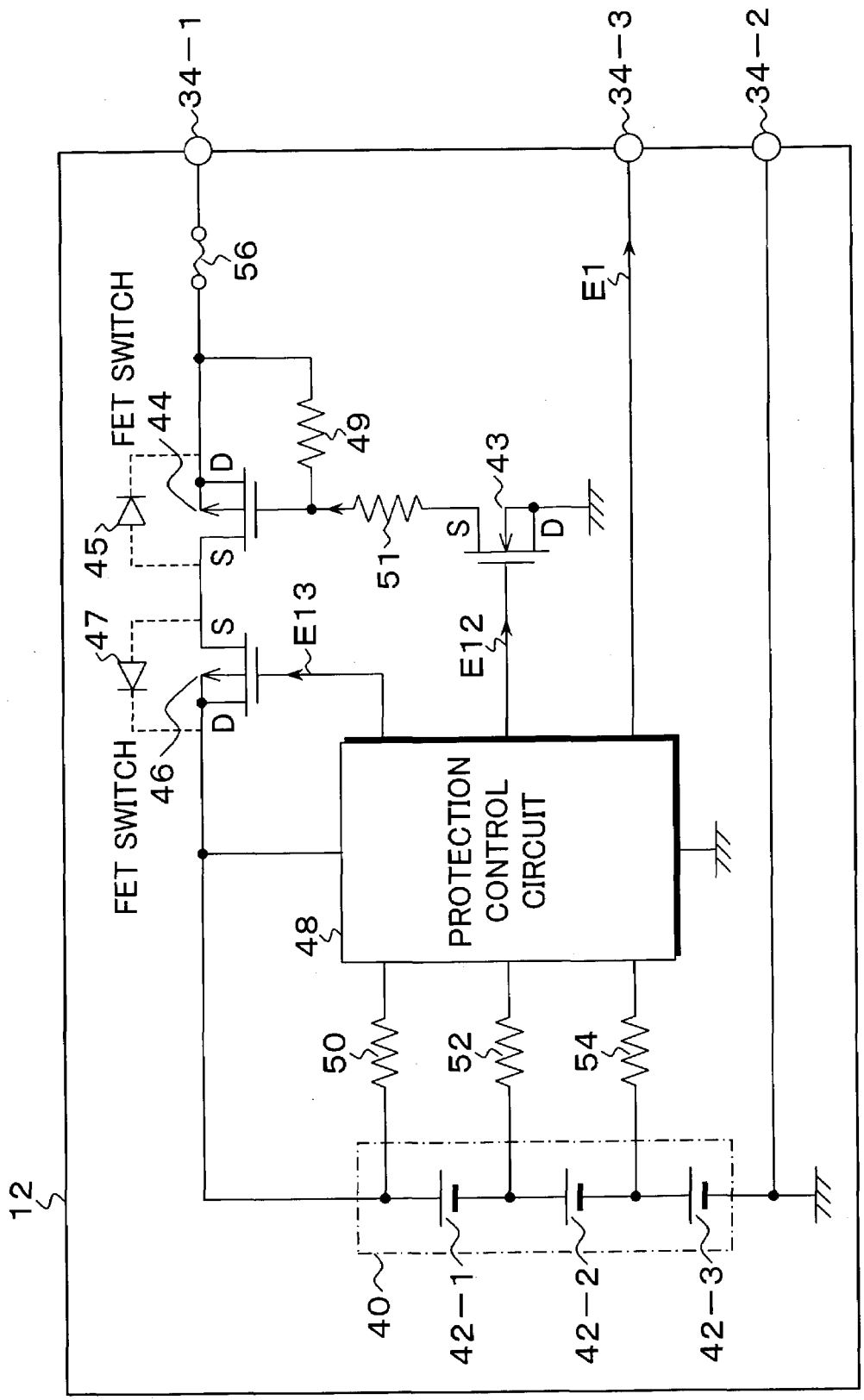
FIG. 2 is a circuit block diagram of a battery pack in FIG. 1.

FIG. 2 shows an example of the battery pack 12 electrically charged by the electric charger 10. The battery pack 12 builds a lithium ion battery 40. In this example, three lithium battery cells 42-1, 42-2, and 42-3 each having a normal battery voltage of 3.6 V are connected in series of each other, thereby obtaining a normal battery voltage of 10.8 V. A charging line is connected to the positive side of the lithium ion battery 40 through MOSFET switches 44 and 46 AND-connected from a positive terminal 34-1, and a signal line is connected to the battery negative side of the lithium ion battery 40 from a negative terminal 34-2. A protection control circuit 48 is arranged in the battery pack 12. The protection control circuit 48 receives battery voltages through resistors 50, 52, and 54 to detect battery voltages of the lithium battery cells 42-1 to 42-3.

The FET switch 44 is a switch which is turned off by detection of overcharging. More specifically, the N-channel FET switch 44 is a P-channel MOSFET. A resistor 49 is connected between the drain and the gate of the FET switch 44. The gate of the FET switch 44 is connected to the source of an inverting P-channel MOSFET 43 through a resistor 51. In a normal state, a control signal E12 goes to an H level, and the MOSFET is in a high impedance state. For this reason, the FET switch 44 is turned on by biasing by the resistor 49. When the control signal E12 goes to an L level in detection of overdischarging, the MOSFET 43 is turned on, and a FET switch 45 is turned off.

The MOSFET switch 46 is a switch which is turned off by detection of overdischarging. More specifically, the MOSFET switch 46 is a P-channel MOSFET. In a normal state, the MOSFET switch 46 is turned on when a control signal E13 is at an L level. The MOSFET switch 46 is turned off when the control signal E12 goes to an H level in detection of overdischarging. In overcharging protection performed by the protection control circuit 48, the battery voltages of the lithium battery cells 42-1 to 42-3 are monitored in charging, and overcharging is decided when the voltage of any one of the battery cells becomes, e.g., 4.25±0.06 V or more, and the FET switch 44 is turned off by the control signal E12. More specifically, in a normal state, the control signal E12 goes to an H level to turn on the FET switch 44. However, when overdischarging is detected, the control signal E12 goes to an L level to turn off the FET switch 44. The canceling condition of the overcharging protection in which the MOSFET switch 46 is turned off is that the voltages of all the lithium battery cells 42-1 to 42-3 decrease 4.05±0.11 V by self-discharging or discharging.

An overdischarging protection operation performed by the protection control circuit 48 will be described below. In the overdischarging protection operation, overdischarging is decided when the voltage of any one of the lithium battery cells 42-1 to 42-3 decreases to 2.40±0.10 V, and the MOSFET switch 46 is turned off by the control signal E13. In a normal state, the control signal E13 goes to an L level to turn on the MOSFET switch 46. When overdischarging is detected, the control signal E13 goes to an H level to turn off the MOSFET switch 46. The canceling condition of the overdischarging protection is that the voltages of all the lithium battery cells 42-1 to 42-3 are recovered to, e.g., 3.10±0.15 V. This condition can be canceled by application of an external power. More specifically, in an overdischarging protection state, the FET switch 44 is in an ON state, and the MOSFET switch 46 is in an OFF state. However, when an external voltage is applied across the terminals 34-1 and 34-2, a charging current flows in the lithium ion battery 40 through a parasitic diode 47 of the MOSFET switch 46 set in an OFF state to recover the voltages of the lithium battery cells 42-1 to 42-3 to 3.10±0.15 V, so that a cutoff state set by overcharging protection can be canceled. When the protection control circuit 48 detects overcharging or overdischarging to perform a cutoff operation, the protection control circuit 48 outputs the battery abnormal signal E1 to the terminal 34-3. The battery abnormal signal E1 goes to an H level in a normal state, and goes to an L level in an abnormal state in which overdischarging or overcharging is detected. As the battery pack 12 to be electrically charged according to the present invention, for example, a lithium ion battery 3UR18650 available from Sanyo Electric can be used.

Figure 3:
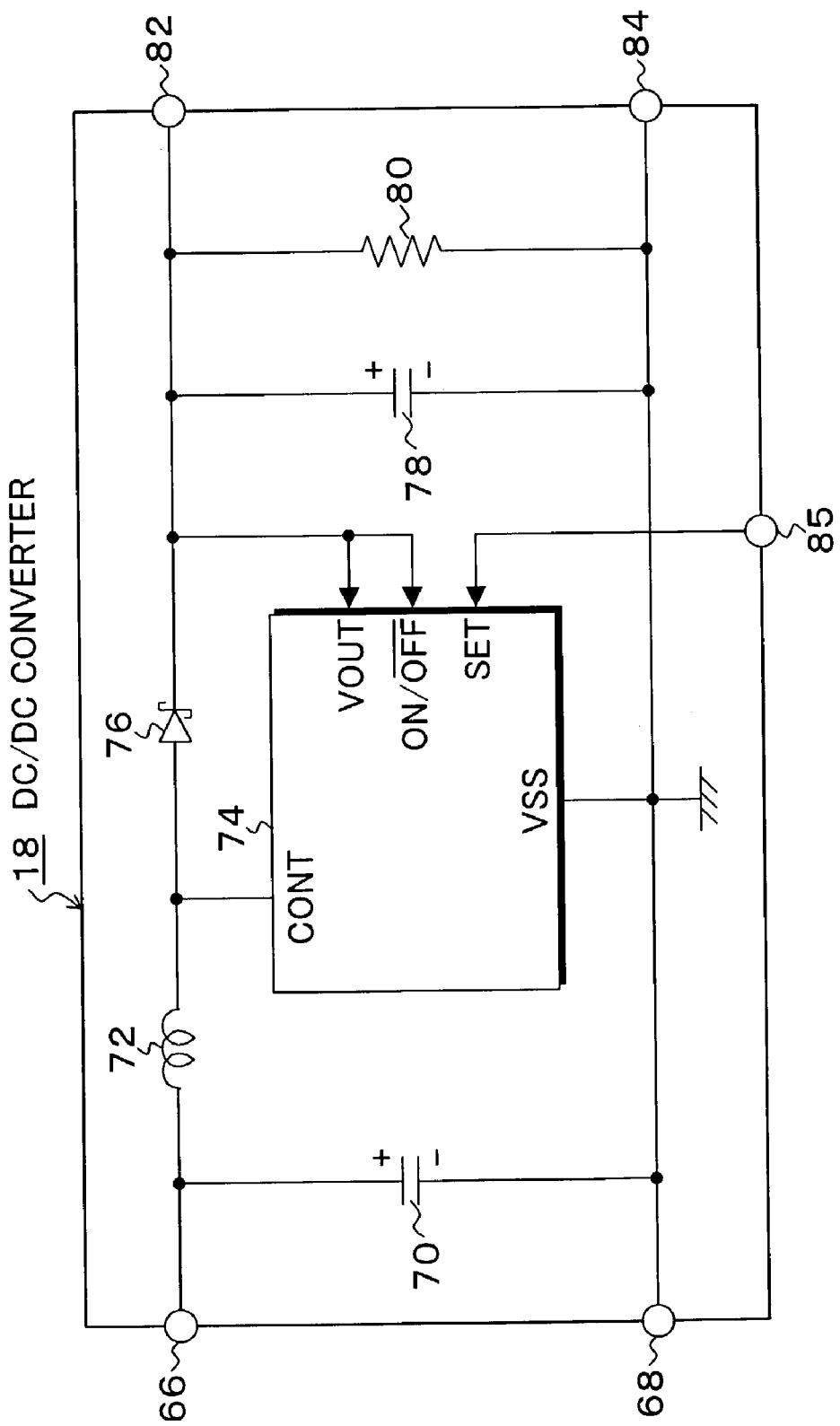
FIG. 3 is a circuit diagram of a DC/DC converter in FIG. 1.

FIG. 3 is a circuit block diagram of the charging DC/DC converter 18 used in the electric charger 10 in FIG. 1. The charging DC/DC converter 18 is constituted by a chopper circuit. More specifically, an input capacitor 70 is arranged subsequently to input terminals 66 and 68, and a control circuit 74 in which a switch element is built is connected in series with an inductance 72. A rectifying zener diode 76 is connected to a branched terminal of the inductance 72, and a smoothing capacitor 78 and a resistor 80 serving as a dummy load are connected to the output side of the zener diode 76, so that constant charging voltages are output from output terminals 82 and 84. The control circuit 74 has a CONT terminal (control terminal), a VSS terminal, a VOUT terminal, an ON/OFF terminal, and an SET terminal. To the SET terminal of these terminals, a charging voltage control signal E4 for switching and setting a charging voltage is supplied from a control terminal 85.

Figure 4:
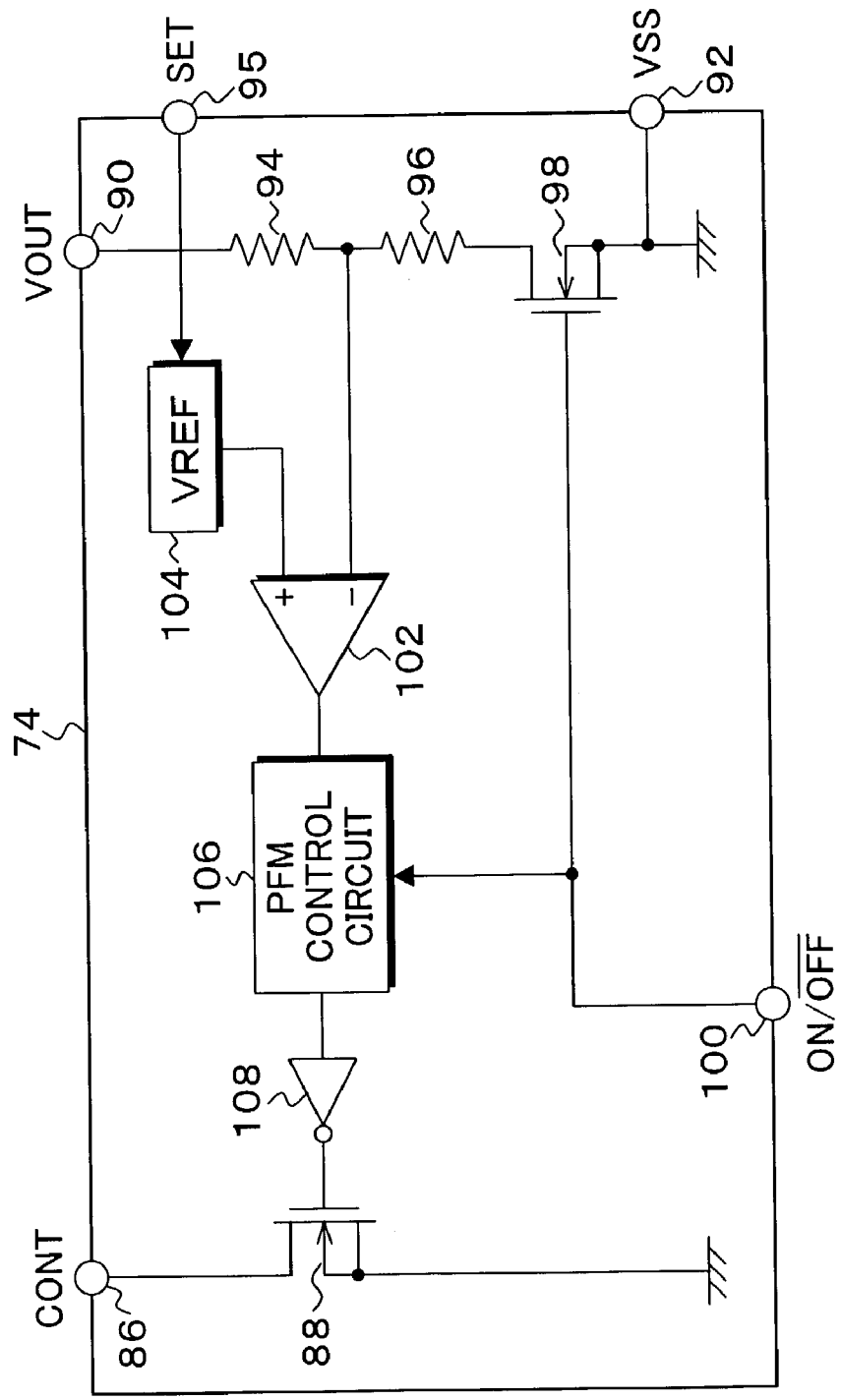
FIG. 4 is a circuit block diagram of a control circuit in FIG. 3.

FIG. 4 is a circuit block diagram of the control circuit 74 in FIG. 3. The control circuit 74 is provided as a control IC, and is constituted by a MOSFET 88 which operates as an inverter switch, resistors 94 and 96 for dividing an output voltage of a VOUT terminal 90, a MOSFET 98 for ON/OFF-controlling the control circuit 74, a reference voltage source 104, an error amplifier 102 for detecting an error, a PFM control circuit 106 for modulating a signal into a pulse frequency signal depending on the error, and a driver 108 using an inverter. In this case, the control signal E4 from the charging control unit 22 shown in FIG. 1 is input to the reference voltage source 104 by a SET terminal 95. When the reference voltage is switched, a charging voltage corresponding to the two cells or three cells can be switched. In addition, when an external control signal is supplied to a terminal 100, the start and stop of the control circuit 74 can be controlled by turning on or off the MOSFET 98. The charging DC/DC converter 18 in FIG. 3 is a self-start type DC/DC converter in which a control voltage is applied to the terminal 100 by a power supply from the AC adapter 14 for the input terminals 66 and 68 regardless of the external control to turn on the MOSFET 98.

Figure 5:
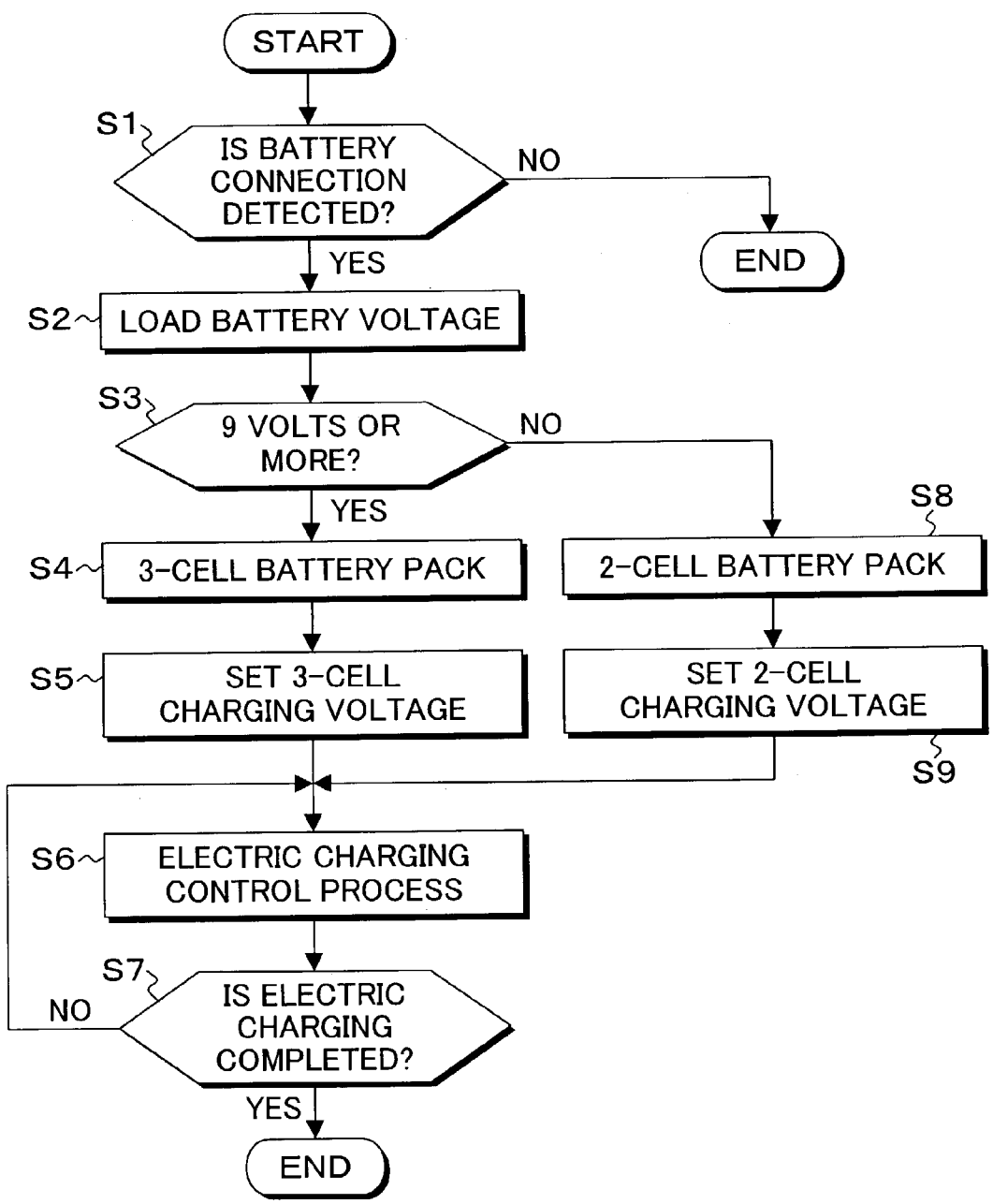
FIG. 5 is a flow chart of a charging control process in FIG. 1.
Figure 6:
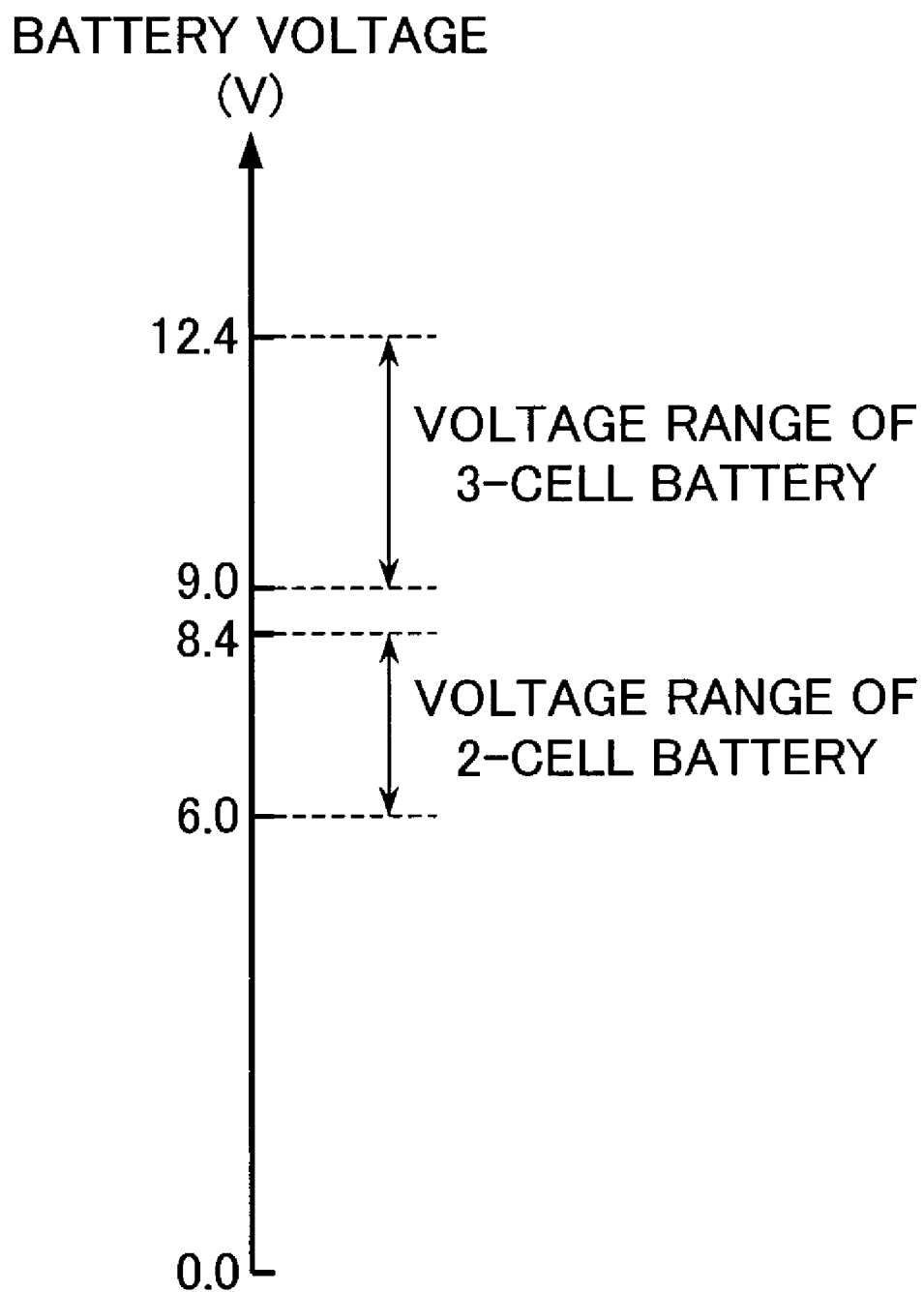
FIG. 6 is a diagram for explaining the correspondence between the numbers of cells and battery voltages.

FIG. 5 is a flow chart of a control process by the charging control unit 22 of the electric charger 10 in FIG. 1. When the battery pack 12 is electrically charged by the electric charger 10 in FIG. 1, a state in which the plug 16 of the AC adapter 14 is inserted into an AC outlet to supply an external power to the electric charger 10 is set. In this state, the battery pack 12 to be electrically charged is also connected to the electric charger 10. When the battery pack 12 is connected to the electric charger 10, the battery abnormal signal E1 output from the battery pack 12 is at an H level representing normal. The H level of the battery abnormal signal E1 is detected by the battery connection detection circuit 26 to output the battery connection detection signal E2 to the charging control unit 22. Therefore, in the charging control process, when the battery pack 12 is connected, the presence/absence of battery connection is checked in step S1. When the battery connection detection signal E2 is normally obtained, it is decided that the battery connection is present, and the control flow shifts to step S2. At this time, a battery voltage detection signal E3 corresponding to the battery voltage of the battery pack 12 detected by the battery voltage detection circuit 28 is loaded. In step S3, it is decided whether the battery voltage is 9 V or more or not. In the cell decision unit 32 arranged in the charging control unit 22 in FIG. 1, a threshold voltage of cell decision for the battery voltage as shown in FIG. 6 is set in advance. A voltage range of a two-cell battery is a range of, e.g., a 6.0 to 8.4 V, and a voltage range of a three-cell battery is a range of 9.0 to 12.4 V. For this reason, as the threshold voltage for deciding the two-cell battery or the three-cell battery, for example, 9 V is set. For this reason, when the battery voltage is 9 V or more in step S3 in FIG. 5, the control flow shifts to step S4 to decide the three-cell battery pack. In step S5, a charging voltage for the three-cell battery, e.g., V1=12.3 V is set. In step S6, charging control is performed by turning on the FET switch 20 in FIG. 1. In this charging control process, a battery voltage in charging is monitored. For example, when the battery voltage is recovered to a predetermined charging voltage, the end of charging is determined in step S7, and the series of processes are completed. With respect to the in-charging and the end of charging, for example, the in-charging and the end of charging are indicated by a display or the like (not shown). In the electric charger 10 shown in FIG. 1 according to the present invention, even though the battery pack 12 has the various numbers of cells, the number of cells of the battery pack 12 is automatically decided by the electric charger 10, so that the battery pack 12 can be electrically charged by a corresponding charging voltage. Even though the number of types of portable terminals increases, the number of electric chargers can be prevented from increasing. In the embodiment in FIG. 1, as the number of cells of the battery pack 12, two or three is employed. However, as the battery pack 12, a one-cell battery pack may be employed, or a battery pack including four or more cells, i.e., the proper number of cells may be employed as a matter of course.

Figure 7:
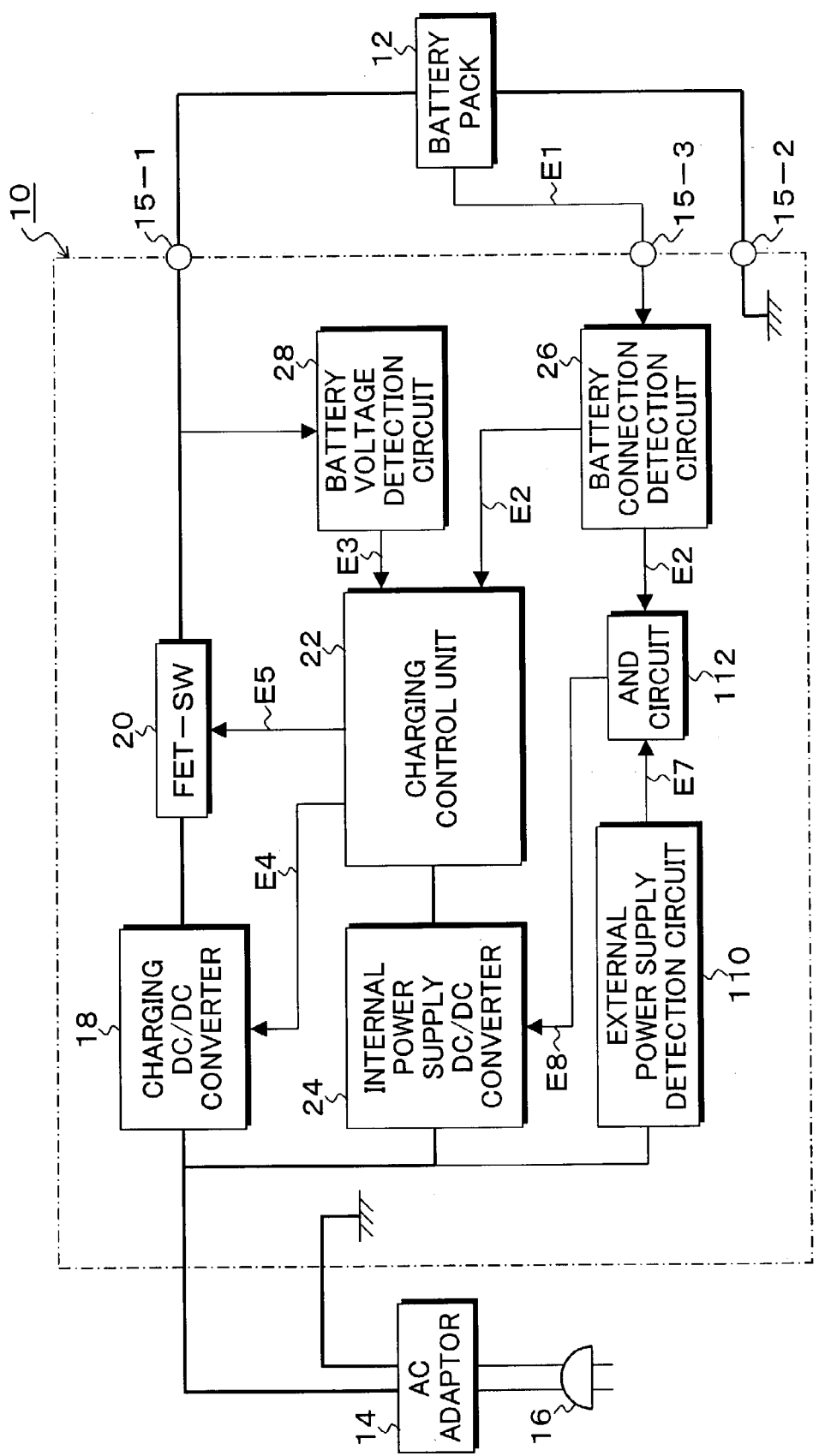
FIG. 7 is a circuit block diagram of the second embodiment of the present invention.

FIG. 7 is a circuit block diagram of the second embodiment of an electric charger according to the present invention. The second embodiment is characterized in that a power consumption caused by an external power supply from an AC adapter in a standby state in which a battery pack is not electrically charged is reduced. An electric charger 10 receives an external power supply by the AC adapter 14. A battery pack 12 is connected to terminals 15-1, 15-2, and 15-3 in charging. In the electric charger 10, a charging DC/DC converter 18, a FET switch 20, a charging control unit 22, an internal power supply DC/DC converter 24, a battery connection detection circuit 26, and a battery voltage detection circuit 28 are arranged. Such a circuit configuration of the electric charger 10 is basically the same as that of the electric charger 10 of the first embodiment. In addition, in the electric charger 10 according to the second embodiment in FIG. 7, an external power supply detection circuit 110 and an AND circuit 112 are newly arranged. The external power supply detection circuit 110 detects a power supply from the AC adapter 14 to output an external power supply detection signal E7 to the AND circuit 112. The AND circuit 112 further receives a battery voltage detection signal E3 from the battery connection detection circuit 26, and calculates a logical AND of detection signals of the external power supply detection signal E7 and the battery voltage detection signal E3 to output a control signal E8 to the internal power supply DC/DC converter 24.

FIG. 8 is a logical table of inputs/outputs of the AND circuit 112 in FIG. 7. In this logical table, the battery voltage detection signal E3 goes to an H level when battery connection is detected, and goes to an L level when no battery connection is detected. The external power supply detection signal E7 goes to an H level when an external power supply is detected, and goes to an L level when no external power supply is detected. For this reason, the internal power supply control signal E8 from the AND circuit 112 goes to an H level when both the detection of the external power supply and the detection of the battery connection are performed to turn on the internal power supply DC/DC converter 24. In contrast to this, when there is at least one L-level input where at least one of the battery connection detection and/or external power supply detection is not performed, the internal power supply control signal E8 goes to an L level to turn off the internal power supply DC/DC converter 24. For this reason, in a standby state in which the battery pack is not electrically charged while supplying an external power supply from the AC adapter 14, the internal power supply DC/DC converter 24 is turned off by the AND circuit 112. Therefore, a power supply voltage V2 to the charging control unit 22 is not supplied, and the operation of the charging control unit 22 is stopped. For this reason, the start control signal E5 to the charging DC/DC converter 18 also goes to an L level to turn off the internal power supply DC/DC converter 24. In this case, although the internal power supply DC/DC converter 24 has the same circuit configuration as that of the first embodiment in FIG. 3, an ON/OFF terminal 100 of the control circuit 74 is not commonly connected to a VOUT terminal 90. The control signal E8 from the AND circuit 112 in FIG. 7 is supplied to the ON/OFF terminal 100. When the control signal E8 is at an L level, the MOSFET 98 is turned off, and the operation of a PFM control circuit 106 is also stopped. As a result, the operation of the internal power supply DC/DC converter 24 is stopped, and the power supply voltage V2 is not output. In this manner, in the electric charger 10 according to the second embodiment shown in FIG. 7, in the standby state in which the battery pack 12 is not connected, a power consumption caused by the charging control unit 22 is prevented by stopping the operation of the internal power supply DC/DC converter 24. Therefore, the power consumption in the standby state can be suppressed.

Figure 9:
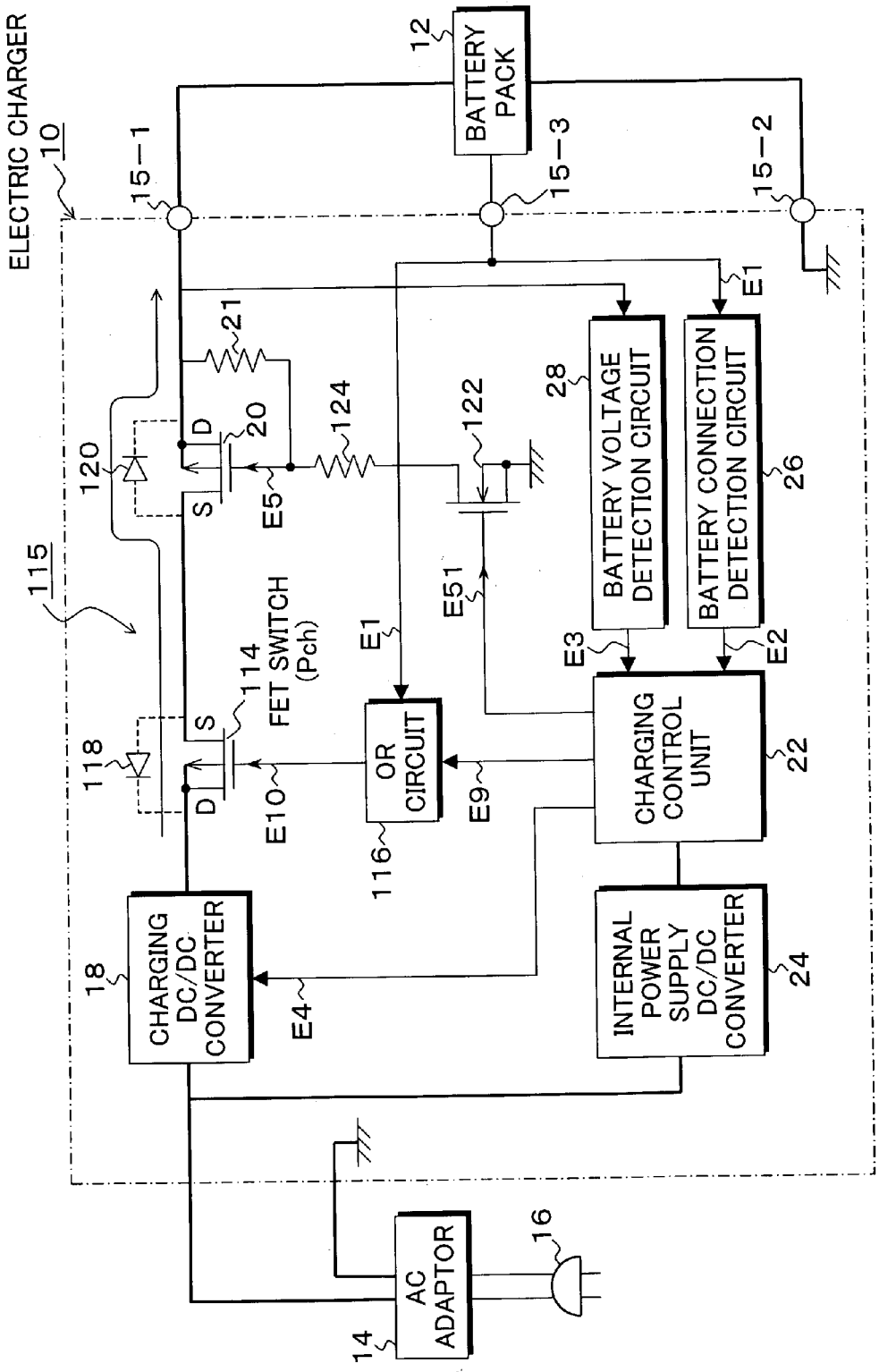
FIG. 9 is a circuit block diagram of the third embodiment of the present invention.

FIG. 9 is a circuit block diagram of the third embodiment of an electric charger 10 according to the present invention. The third embodiment is characterized in that, when a battery pack in which a detection output is cut off by overdischarging protection is connected to the electric charger, the cutoff state can be automatically canceled. The electric charger 10 receives an external power supply by the AC adapter 14. A battery pack 12 to be electrically charged is connected to terminals 15-1, 15-2, and 15-3. In the electric charger 10, a charging DC/DC converter 18, a charging control unit 22, an internal power supply DC/DC converter 24, a battery connection detection circuit 26, and a battery voltage detection circuit 28 are arranged. Such a circuit configuration of the electric charger 10 is basically the same as that of the electric charger 10 of the second embodiment in FIG. 7. In addition, in the electric charger 10 according to the third embodiment, an FET switch 20 using an N-channel MOSFET and a FET switch 114 are connected between the charging DC/DC converter 18 and the charging line on the connection side of the battery pack 12 of the terminal 15-1 to form an AND circuit. The FET switch 20 is the same as that in the first embodiment in FIG. 1 and the second embodiment in FIG. 7. The FET switch 20 is a switch which is turned on by an H level of a control signal E5 from the charging control unit 22 in charging and which is turned off by an L level set by completion of charging. Actually, as shown in FIG. 9, a biasing resistor 21 is connected between the drain and the gate, and the gate is connected to the source of a P-channel MOSEFT 122 through a resistor 124. A control signal E51 is supplied from the charging control unit 22 to the gate of the MOSEFT 122. The control signal E51 goes to an H level in detection of battery connection to turn off the MOSEFT 122. At this time, the control signal E5 also goes to an L level to turn off the FET switch 20. The control signal E51 goes to an L level in detection of battery disconnection to turn on the MOSEFT 122. AT this time, the control signal E5 goes to an L level to turn off the FET switch 20. The FET switch 114 is a switch which is newly arranged to prevent a battery voltage from the battery pack 12 from being consumed by flowing into the circuit of the electric charger 10 when the battery pack 12 is connected to the electric charger 10 in a state in which no power is supplied from the AC adapter 14. More specifically, when the battery pack 12 is connected in the state in which no power is supplied from the AC adapter 14, the battery abnormal signal E1 output from the battery pack 12 is set at an H level representing a normal state, and the FET switch 20 is turned on on the basis of detection of battery connection by the battery connection detection circuit 26. At this time, although the charging control unit 22 does not operate, the battery abnormal signal E1 in the H-level state passes through the battery connection detection circuit 26 and the charging control unit 22, and directly becomes the control signal E51 to turn off the MOSEFT 122. Therefore, the FET switch 20 is directly turned on by the battery abnormal signal E1. In this case, when only the FET switch 20 is arranged, the battery voltage from the battery pack 12 is supplied to the input side, and the power is consumed. For this reason, the FET switch 114 which is turned on in the battery disconnection state including the cutoff state of the battery pack 12, so that the battery voltage from the battery pack 12 is prevented from being input, supplied, and consumed. As the FET switch 114, a P-channel MOSFET is used. The FET switch 114 is turned off when a control signal E10 to the gate is at an H level, and is turned on when the control signal E10 is at an L level. Of the two FET switches 114 and 20 which are connected to the charging line of the charging DC/DC converter 18 to form an AND circuit, the FET switch 114 which is arranged to prevent power consumption caused by connection of the battery pack 12 in a state in which an external power supply is not supplied is used to automatically perform an operation of canceling a cutoff state set when the battery pack 12 the battery output of which is set in a cutoff state by overdischarging protection. In order to cancel the cutoff state of the battery pack 12, a new OR circuit 116 is arranged. The battery abnormal signal E1 from the battery pack 12 is input to the OR circuit 116. A control signal E9 is input from the charging control unit 22 to the OR circuit 116. The control signal E9 goes to an H level in detection of disconnection to turn off the FET switch 114, and goes to an L level in detection of battery connection to turn on the FET switch 114. For this reason, a cutoff canceling circuit 115 according to the third embodiment is constituted by the OR circuit 116 and the FET switches 20 and 114.

An operation of the electric charger 10 in FIG. 9 will be described below. When the battery pack 12 the battery output of which is cut off by an overdischarging protection operation is connected to the electric charger 10 set in a standby state in which the electric charger 10 receives a power supply from the AC adapter 14, the battery abnormal signal E1 from the battery pack 12 is at an L level. For this reason, the control signal E10 from the OR circuit 116 also goes an L level to turn on the FET switch 114. Therefore, the charging voltage V1 from the charging DC/DC converter 18 is applied to the battery pack 12 through a parasitic diode 120 of the FET switch 20. At this time, the battery pack 12, as shown in FIG. 2, the FET switch 44 is in an ON state, and the MOSFET switch 46 is in an OFF state for overdischarging protection. When the charging voltage V1 is applied across the terminals 34-1 and 34-2, the charging voltage is applied to the lithium ion battery 40 through the FET switch 44 set in the ON state and the parasitic diode 47 of the MOSFET switch 46 set in the OFF state. When the battery voltages of the lithium ion battery cells 42-1 to 42-3 are recovered to 3.10±0.15 V with this application of the charging voltage, the control signal E13 of the protection control circuit 48 returns from the H level to the L level to turn on the MOSFET switch 46, so that the cutoff state is canceled. When the cutoff state of the battery pack 12 is canceled, the battery abnormal signal E1 returns from the L level which has been set to the H level representing a normal state, and the battery connection detection circuit 26 of the electric charger 10 outputs the battery connection detection signal E3 to the charging control unit 22. In this manner, the charging control unit 22 outputs the H-level control signal E5 to the MOSEFT 122 to turn off the MOSEFT 122, and the FET switch 20 is turned on. At the same time, the charging control unit 22 outputs the L-level control signal E9 to the OR circuit 116, and the control signal E10 is kept at the L level, so that the FET switch 114 is kept in an ON state. Charging to the battery pack 12 the cutoff state of which is canceled is started by the charging DC/DC converter 18. At this time, the charging control process by the charging control unit 22 is the same as that in, e.g., the first embodiment shown in the flow chart in FIG. 5. As described above, according to the electric charger 10 of the third embodiment in FIG. 9, even though the battery pack 12 the battery output of which is cut off by the internal protection circuit operated by overdischarging is used, the cutoff state of the battery pack 12 which performs a protection operation can be canceled with a very simple circuit configuration without arranging a special configuration, in which battery connection is detected by a microswitch or the like or a voltage is applied to a battery pack in a predetermined period, in the electric charger 10.

Figure 10:
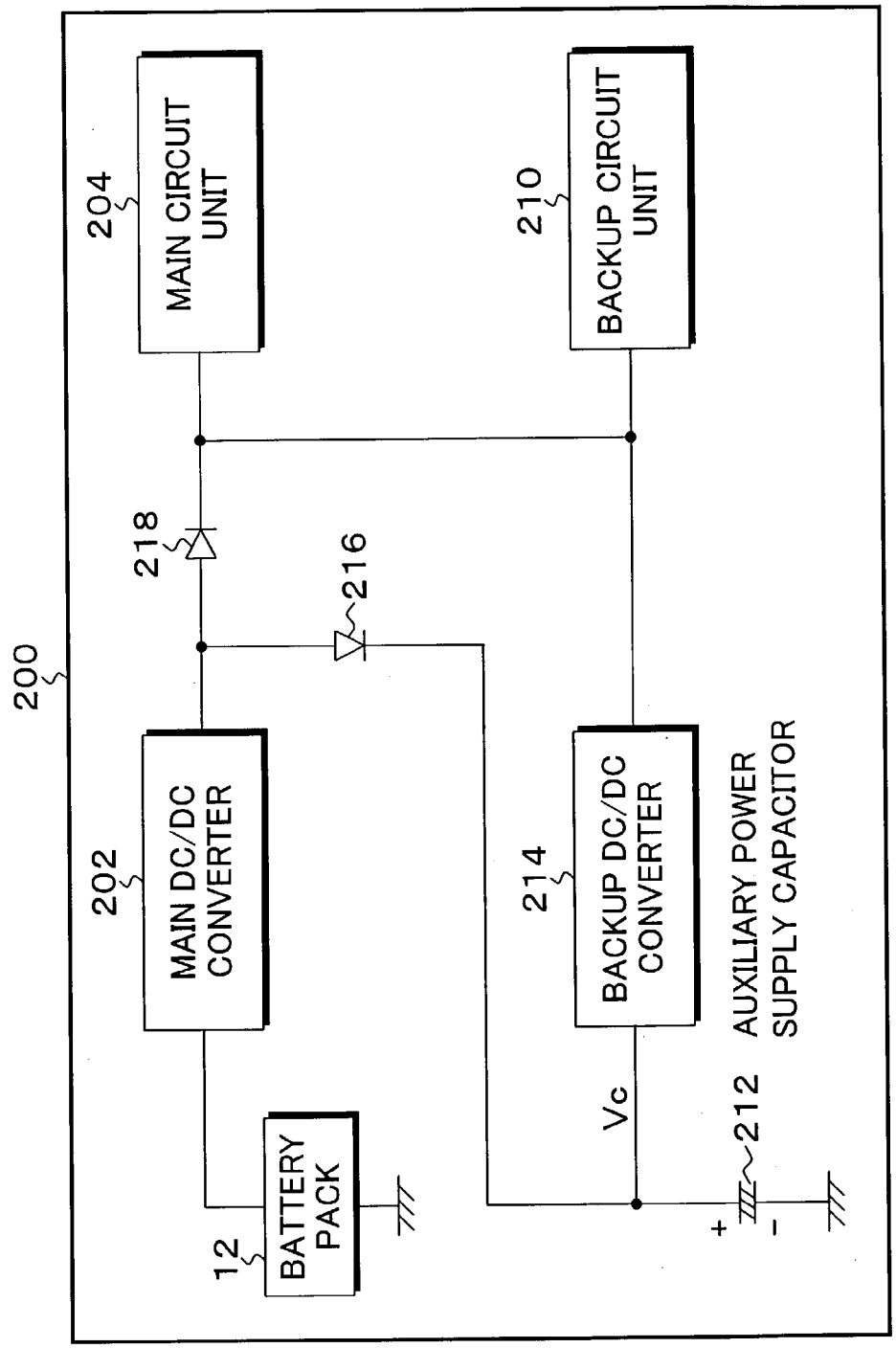
FIG. 10 is a block diagram of a portable terminal power supply device according to the present invention.

FIG. 10 is a circuit block diagram of an embodiment of a power supply device according to the present invention in which a portable terminal device using the battery pack 12 electrically charged by the electric charger according to the present invention is exemplified. A portable terminal 200 is used such that the battery pack 12 the charging of which is completed by the electric charger 10 according to the present invention is loaded on the portable terminal 200. A battery voltage from the battery pack 12 is converted by a main DC/DC converter 202 into, e.g., 5 V which is a predetermined power supply voltage corresponding to a main circuit unit 204, and the voltage is supplied through a diode 218. For the power supply unit of the portable terminal 200 constituted by the battery pack 12 and the main DC/DC converter 202, a backup auxiliary power supply unit which backs up a power supply for maintaining the main circuit unit 204 in a suspend state when the battery pack 12 is exchanged is arranged. As the auxiliary power supply unit, according to the present invention, the auxiliary power supply capacitor 212 is connected to the input of a backup DC/DC converter 214, and the auxiliary power supply capacitor 212 is electrically charged by an output voltage from the main DC/DC converter 202 through a diode 216. The backup DC/DC converter 214 supplies a power to the main circuit unit 204 and a backup circuit unit 210. The backup circuit unit 210 operates when the battery pack 12 is removed, and sets the main circuit unit 204 in a suspend state. As the auxiliary power supply capacitor 212, a large-capacity electric double layer capacitor which is known as a super capacitor is used. The electric double layer capacitor has small dimensions, i.e., a diameter of about 7 to 20 mm and a thickness of 1.4 to 2.2 mm, but has a very large capacitance, e.g., 0.10 farads to 2.0 farads. When such an electric double layer capacitor having a sufficient capacity is used as the auxiliary power supply capacitor 212, the suspend state of the main circuit unit 204 which is necessary in exchange of the battery pack 12 can be maintained for, e.g., about several minutes.

Figure 11:
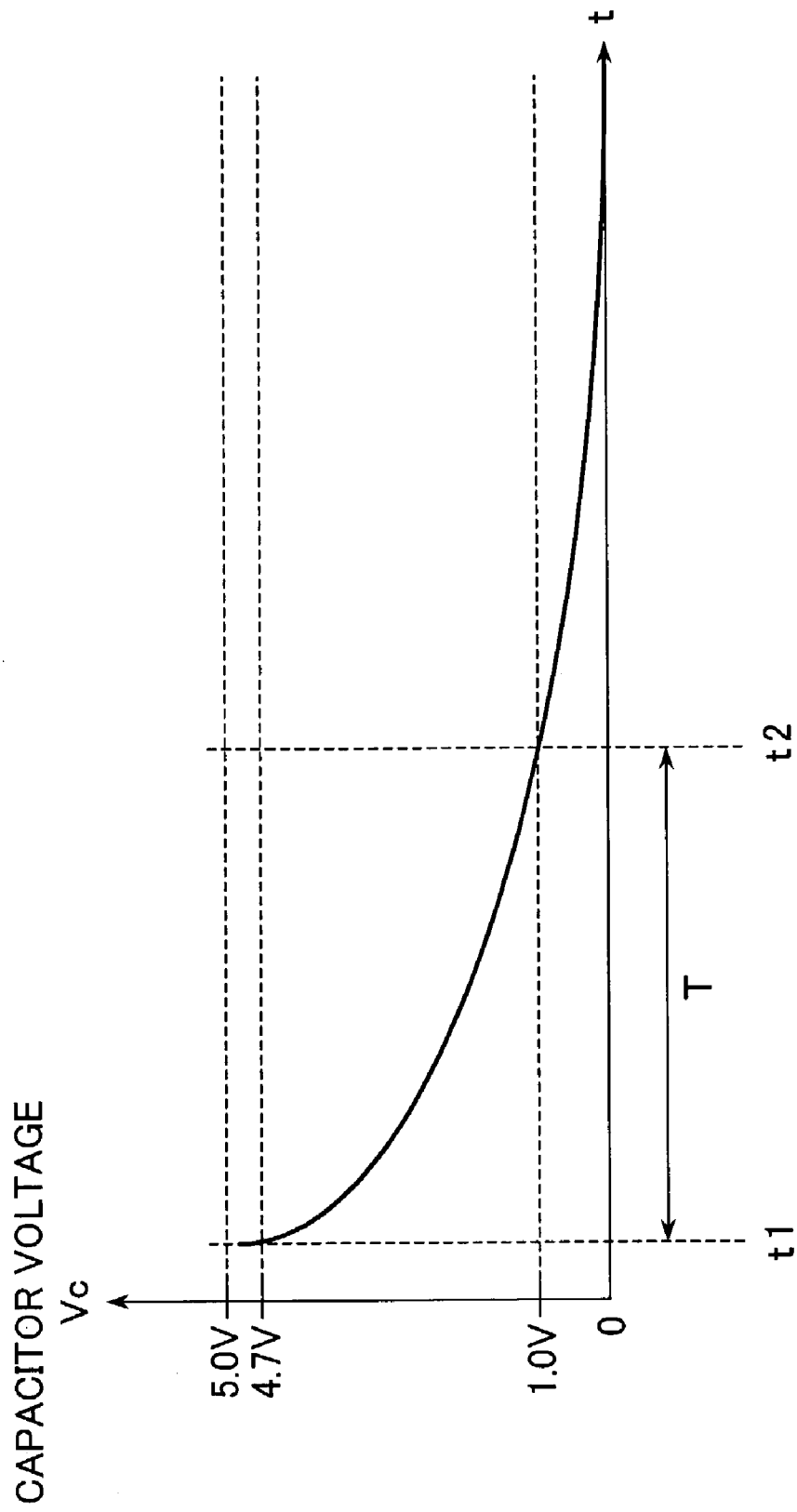
FIG. 11 is a time chart of an output voltage obtained by a backup DC/DC converter in FIG. 10 when a battery is removed.

FIG. 11 shows a change in voltage drop with time in the suspend state of the auxiliary power supply capacitor 212 using the electric double layer capacitor in FIG. 10. The auxiliary power supply capacitor 212 is electrically charged by an output voltage of 5 V of the main DC/DC converter 202 to exhibits 5 V at backup start time t1. The voltage of the auxiliary power supply capacitor 212 decreases with time by power consumption caused by conversion into an output voltage of 5 V by the backup DC/DC converter 214 with the start of a backup operation. For the decrease in voltage of the auxiliary power supply capacitor 212, the backup power supply voltages to the backup circuit unit 210 and the main circuit unit 204 are stably kept at 5 V by the backup DC/DC converter 214, and do not change. The backup DC/DC converter 214 has a circuit function for maintaining a stable output of 5 V until an input voltage decreases to 1 V. Therefore, in FIG. 11, when the voltage of the auxiliary power supply capacitor 212 decreases to 1 V at time t2, an output voltage of 5 V obtained by the backup DC/DC converter 214 cannot be secured. This time is backup end time. When a large-capacity electric double layer capacitor which is known as a super capacitor is used as the auxiliary power supply capacitor 212, as a backup time from backup start time t1 to end time t2, T=5 to 6 minutes can be secured. When such a backup time can be obtained, a sufficient time which is required when the battery pack 12 of the portable terminal 200 is removed and replaced with a new charged battery pack can be secured.

Figure 12:
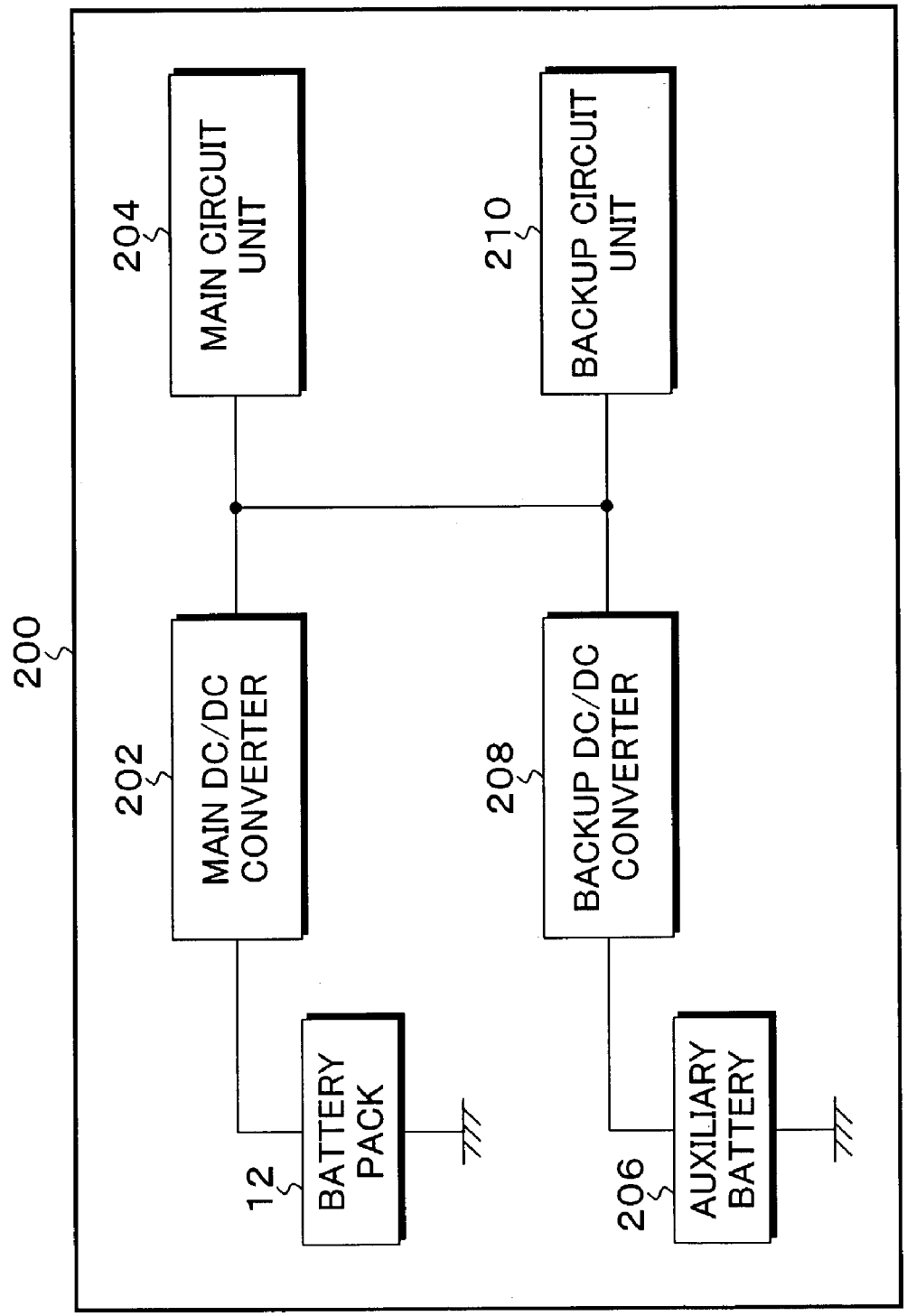
FIG. 12 is a block diagram of a conventional portable terminal power supply device.

FIG. 12 shows a portable terminal 200 serving as a comparative example in which an auxiliary battery 206 such as disposable lithium battery is used as an auxiliary battery. IN the portable terminal 200 using the auxiliary battery 206, when the battery pack 12 is to be exchanged, the battery voltage of the auxiliary battery 206 is stabilized by a backup DC/DC converter 208, and a backup power for maintaining the suspend state of the main circuit unit 204 is supplied by the backup circuit unit 210. However, in the portable terminal 200 using the auxiliary battery 206 in FIG. 12, the auxiliary battery 206 is consumed by repeating exchange of battery packs 12, and the auxiliary battery 206 must be exchanged at predetermined periods, every half year or every year. In addition, the portable terminal 200 requires a structure which has a detachable storage section and a lid like the battery pack 12 to make it possible to exchange the auxiliary battery 206. In contrast to this, in the portable terminal 200 using the auxiliary power supply capacitor 212 according to the present invention in FIG. 10, a structure for exchanging batteries as in use of the auxiliary battery 206 in FIG. 12 or a structure of a detachable device for the auxiliary battery 206 is not necessary, and it needs only to fixedly mount the auxiliary power supply capacitor 212 on the circuit board of the power supply unit together with the biasing resistor 21 and the like. As a result, the battery pack 12 of the portable terminal 200 can be exchanged regardless of an auxiliary power supply, and a structure required for exchange of the portable terminal 200 is not arranged. Accordingly, reductions in size and weight of the portable terminal 200 can be achieved.

The present invention is not limited to the above embodiments, and includes appropriate modifications without damaging the objects and advantages of the invention. The present invention is not limited by the numerical values described in the above embodiments.

INDUSTRIAL APPLICABILITY

As has been described above, according to the present invention, when a battery pack is connected to an electric charger, the number of cells is decided by the voltage of the connected battery pack to automatically determine a charging voltage. For this reason, even battery packs having the different numbers of battery packs can be electrically charged by using the same electric charger. Even though the number of portable terminals using batteries increases, the number of types of required electric chargers can be reduced.

In addition, in a standby state in which a battery pack is not connected while supplying an external power from an AC adapter, power supply to a charging control unit is stopped, so that a wasteful power can be prevented from being consumed in the standby state of the electric charger 10.

Furthermore, when a battery pack the battery output is cut off by an overdischarging protection operation is connected to an electric charger, one of two FET switches which are connected to a charging path to form an AND circuit is turned on by a battery abnormal signal, and the other switch can automatically cancel the cutoff state of the battery pack such that a charging voltage is applied to the battery pack in the cutoff state by using the parasitic diode of the switch. The cutoff state of the battery pack set in the cutoff state by overdischarging protection is canceled by a simple circuit without detection of electric connection by a microswitch or periodical voltage application, and charging of the battery pack can be started.

In addition, in a power supply device of a portable terminal using a battery as a power supply, a capacitor electrically charged by a power supply on the main side is used as an auxiliary power supply for backing up a main circuit unit which is set in a suspend state in exchange of batteries, and the capacitor for the auxiliary power supply is stabilized by a DC/DC converter to be used as a backup power supply to supply a power in exchange of batteries, thereby making an auxiliary battery used as an auxiliary power supply and exchange of the auxiliary battery unnecessary. Further reductions in size and weight of the portable terminal can be achieved.

The invention claimed is:

1. An electric charger, comprising:
a charging circuit outputting a charging voltage in correspondence with the number of battery cells incorporated in a battery in a supply state of an external power supply;
a charging control unit which, upon detection of connection of said battery functioning normally, said battery is charged by turning on a switch unit provided in a connection path extending from the charging circuit to the battery; and
a cutoff releasing circuit which, upon detection of connection of said battery in a cutoff state caused by overdischarge, outputs a releasing voltage for releasing the cutoff state set by over-discharge of the battery,
wherein the cutoff releasing circuit comprises:
a first FET switch connecting a drain to the output of the charging circuit;
a second FET switch which has a source connected to the source of the first FET switch and a drain connected to the battery and which is ON/OFF-controlled by the charging control unit, and
a switch control circuit which, upon connection of said battery in a cutoff state caused by over-discharging, turns on the first FET switch in accordance with a battery abnormal signal outputted from the battery, thereby applying a charge voltage for releasing the cutoff state to the battery via a parasitic diode of the second FET switch in an OFF state.

2. An electric charger according to claim 1, wherein the switch control circuit is an OR circuit which enters a switch-on signal output from the charging control unit when detecting a battery abnormal signal output from the battery upon connection of a battery in a cutoff state caused by said discharge, or when detecting connection of the battery functioning normally, the output of the switch control circuit is connected to the gate of the first FET switch.

3. An electric charger according to claim 1, characterized in that the battery is a lithium ion battery.

* * * * *